(12) United States Patent
Maier et al.

(10) Patent No.: US 10,699,497 B2
(45) Date of Patent: Jun. 30, 2020

(54) CONFIGURING TELEMATICS DEVICES (71) Applicant: Verizon Patent and Licensing Inc., Basking Ridge, NJ (US)

(72) Inventors: Ralph J. Maier, Austin, TX (US); Toshiyuki Hishida, Austin, TX (US); Joshua Praul, Marlton, NJ (US); Paul Casey, Austin, TX (US); John Thomas Morris, Round Rock, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 12 days.

(21) Appl. No.: 16/055,679

(22) Filed: Aug. 6, 2018

(65) Prior Publication Data
US 2020/0043250 A1    Feb. 6, 2020

(51) Int. Cl.
*G07C 5/00* (2006.01)
*H04W 4/44* (2018.01)
*H04W 4/38* (2018.01)
*G01S 19/39* (2010.01)

(52) U.S. Cl.
CPC .............. *G07C 5/008* (2013.01); *G01S 19/39* (2013.01); *H04W 4/38* (2018.02); *H04W 4/44* (2018.02)

(58) Field of Classification Search
CPC .......... G07C 5/008; H04W 4/44; H04W 4/38; G01S 19/39

USPC ............................................. 701/1
See application file for complete search history.

(56) References Cited

U.S. PATENT DOCUMENTS

| 2007/0055414 A1* | 3/2007 | Darji ...................... G07C 5/008 701/2 |
| 2014/0277828 A1* | 9/2014 | Bullister ................ G07C 5/008 701/1 |

* cited by examiner

*Primary Examiner* — Brian P Sweeney (57) ABSTRACT

A telematics configuration platform receives telematics device data that specifies hardware and software features associated with a telematics device, and identifies a first set of values for a first set of telematics device parameters. The telematics configuration platform receives user input identifying a particular vehicle type, and identifies a second set of values for a second set of device parameters. The telematics configuration platform generates a telematics device configuration that includes a third set of device parameters including a first parameter from the first set of telematics device parameters and a second parameter from the second set of telematics device parameters, and a third set of values for the third set of device parameters, each corresponding to either a first value in the first set of values or a second value in the second set of values. The telematics configuration platform performs an action based on the telematics device configuration.

20 Claims, 6 Drawing Sheets

CONFIGURING TELEMATICS DEVICES

BACKGROUND

Telematics involves the integrated use of communications and information technology to transmit, store and receive information from telecommunications devices to remote objects over a network. A telematics device can be used to monitor an asset (e.g., a vehicle) such as by employing a global positioning system (GPS), sensors, and other hardware and software to track information regarding location of the asset, status of the asset, and/or the like.

DETAILED DESCRIPTION OF PREFERRED EMBODIMENTS

The following detailed description of example implementations refers to the accompanying drawings. The same reference numbers in different drawings can identify the same or similar elements.

Telematics devices are often used to track a variety of information regarding vehicles (e.g., automobiles, human-powered vehicles, aircraft, watercraft, trains, and/or the like), such as location-based information (e.g., geographic location, acceleration, speed, and/or the like), vehicle specific information (e.g., fuel level, fuel consumption, vehicle status, and/or the like), and/or the like. The information provided by telematics devices can be used by a variety of entities, including individuals (e.g., for personal use) and organizations (e.g., for fleet management, vehicular analytics, and/or the like). A wide variety of telematics devices exist, including vehicle specific telematics devices, after market telematics devices, telematics devices with different combinations of hardware and/or software, and/or the like. Configuring telematics devices, e.g., to provide information useful to a user, is often a time consuming and inefficient process, due to the wide variety of telematics devices that can be used, and the wide variety of information that a user might find useful.

Some implementations, described herein, provide a telematics configuration platform that is capable of facilitating the configuration of a wide variety of telematics devices for many different users (e.g., individuals and/or organizations) and for many different uses. For example, the telematics configuration platform can receive, from a telematics device, information regarding the hardware and/or software used by the telematics device. Based on the device information, the telematics configuration platform can identify a variety of parameters (and corresponding values for the parameters) that indicate various capabilities associated with the telematics device (e.g., capabilities of the hardware and/or software included in the telematics device). In addition, the telematics configuration platform can use information identifying a user associated with the telematics device (e.g., an individual or organization), and provide the user with vehicular configuration options for which the user is able to provide input (e.g., enabling a user to select the type of vehicle, intended use of the vehicle, and/or the like). Using the user input, the telematics configuration platform can generate a telematics device configuration. The telematics device configuration can be provided to the telematics device (e.g., to configure the telematics device) and/or a telematics server device (e.g., a device used to process information received from telematics devices) that can use the telematics device configuration to configure the manner in which the telematics server device collects and/or uses information received from telematics devices.

In this way, the telematics configuration platform can facilitate the configuration of telematics devices, in a manner designed to be relatively quick, uniform, and flexible, and in a manner designed to conserve both human and computing resources. For example, the telematics configuration platform can use previously stored information to determine default configuration parameters and values for various telematics devices, which can enable quick and uniform configuration by obviating the need to manually configure telematics devices. Flexibility can be provided by enabling a user to manually configure some telematics device parameters, e.g., overriding default configuration parameters when appropriate. In addition, for some telematics devices, the telematics configuration platform can configure the telematics devices remotely, obviating the need for configuration to be performed at the location of the telematics devices (e.g., by a technician or a user). Several different stages of the process for configuring telematics devices are automated, which can improve speed and efficiency of the process and conserve computing resources (e.g., processor resources, memory resources, and/or the like). Furthermore, implementations described herein use a rigorous, computerized process to perform tasks or roles that were not previously performed. Also, automating the process for configuring telematics devices conserves computing resources (e.g., processor resources, memory resources, and/or the like) that would otherwise be wasted by using manual processes for attempting to determine the capabilities of telematics devices, which parameters are available to configure, which values should be used, and/or the like.

Figure 1A:
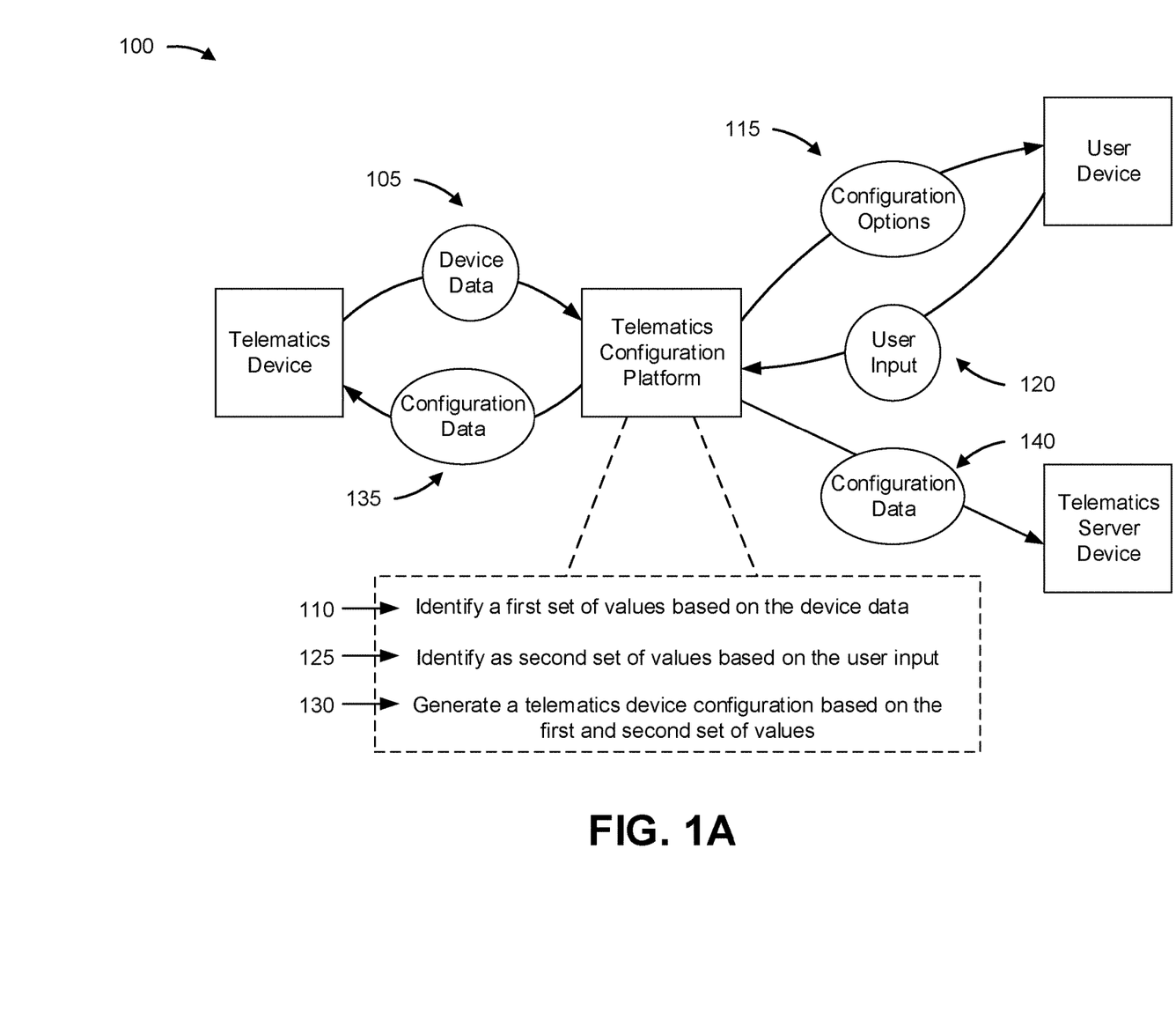
FIGS. 1A-1C are diagrams of example implementations described herein.

FIG. 1A is a diagram of an example implementation 100 described herein. As shown in FIG. 1A, example implementation 100 includes a telematics device (e.g., a telecommunications device, mobile device, global positioning satellite (GPS) device, and/or the like); a telematics configuration platform (e.g., a server computer, a cloud computing platform, and/or the like); a user device (e.g., a personal computer, mobile device, server computer, and/or the like); and a telematics server device (e.g., a personal computer, server computer, cloud computing platform, and/or the like). While the devices of implementation 100 are depicted separately, in some implementations, the functionality of one or more of the devices of implementation 100 can be included in another device, or can be included in multiple, distributed devices.

As shown by reference number 105, the telematics configuration platform receives telematics device data from the telematics device. The telematics device data can include a variety of information regarding the telematics device, such as a device identifier that identifies the type of telematics device, hardware features of the telematics device, software features of the telematics device, a user identifier associated with the telematics device, and/or the like. In some implementations, the device data can include a device identifier that enables the telematics configuration platform to identify various hardware and/or software features of the telematics device. For example, the device data can include, for the telematics device, data identifying a device make, a device model, a device serial number, a device owner, and/or the like.

In some implementations, the device data can include information specifying particular hardware and/or software features of the telematics device. By way of example, the device data can include data specifying wireless communications hardware (e.g., Wi-Fi radio, Bluetooth radio, Global System for Mobile communications (GSM) radio, 3G radio, 4G LTE radio, 5G new radio, and/or the like); data specifying vehicular communications hardware (e.g., hardware enabling communications with a vehicle computer, vehicle sensors, and/or the like); global positioning satellite (GPS) hardware (e.g., a GPS receiver); data processor hardware (e.g., a single-core processor, multi-core processor, integrated circuit, and/or the like); data storage hardware (e.g., data storage type and capacity); operating system software (e.g., software used to operate the telematics device); telematics device software (e.g., software enabling various features of the telematics device); and/or other information that might be relevant to a telematics device. In some implementations, the device data can include additional detail regarding the features of the telematics device, such as the make and model of the hardware included in the telematics device, firmware and software version numbers, and/or the like.

In some implementations, data identifying a user can be included in the device data or separately provided to the telematics configuration platform. In some implementations, the telematics configuration platform receives the device data for a telematics device remotely. For example, the telematics device can wirelessly communicate the device data to the telematics configuration platform (e.g., using wireless communications capabilities of the telematics device). In some implementations, the telematics configuration platform can receive the device data for a telematics device indirectly (e.g., through another device, such as a user device). For example, a user, or a representative assisting the user, can obtain the device data by communicating with the telematics device using a user device (e.g., a mobile phone, tablet, and/or the like), and the user device can forward the device data to the telematics configuration platform.

In this way, the telematics configuration platform is able to receive information that enables the telematics configuration platform to identify the hardware and/or software features of a telematics device. The telematics configuration platform can use the device data to determine various configuration parameters and values for the telematics device.

As shown by reference number 110, the telematics configuration platform identifies a first set of values for a first set of telematics device parameters based on the device data. The device parameters indicate hardware and/or software features, and the corresponding values indicate the manner in which the telematics device supports the hardware and/or software features. For example, a telematics device parameter can include wireless communications hardware, and a value (or values) associated with the wireless communications hardware can indicate which type of wireless communications are supported by the telematics device (e.g., Wi-Fi, Bluetooth, 3G, 3G LTE).

In some implementations, the device data received from the telematics device can include information identifying the parameters and range of values available for those parameters. For example, the device data can include information indicating that a Wi-Fi radio and GPS radio are included in the telematics device. The information indicating the parameters associated with the telematics device can be broad (e.g., a binary indication regarding whether the telematics device includes or supports a particular hardware or software feature) or specific (e.g., identifying a model number of particular hardware, firmware version numbers, software version numbers, and/or the like). In some implementations, the device data can enable the telematics configuration platform to obtain the first set of values and/or the first set of device parameters from another source. For example, based on a telematics device identifier (e.g., a model number, serial number, and/or the like), the telematics configuration platform can obtain the first set of parameters and first set of values (e.g., from a data storage device, or by requesting the parameters and/or values from a third party device associated with the telematics device, such as a server computer associated with the telematics device manufacturer).

In some implementations, the first set of values and the first set of parameters can include default values and parameters associated with the telematics device. Default values and parameters can be previously determined, for example, by the telematics configuration platform, by telematics device manufacturers, by user configuration, by configuration specific to the entity associated with the telematics device, and/or the like. By way of example, the telematics configuration platform can receive device data that includes a telematics device identifier. Using the device identifier, the telematics configuration platform can obtain previously stored default first values and first parameters associated with the telematics device. Example parameters and values can include: a parameter for wireless communications and a corresponding value indicating that the telematics device supports Wi-Fi, 3G, and 4G LTE; a parameter for a GPS receiver and a corresponding value indicating that the telematics device includes the GPS receiver; a parameter for operating system software included in the telematics device and a value indicating which operating system (and/or operating system version) is in use by the telematics device. Other example parameters can include any parameters that indicate capabilities of the hardware and/or software associated with the telematics device (e.g., battery life, effective wireless range, supported vehicle communications, environmental sensors, and/or the like).

In this way, the telematics configuration platform can obtain, for a telematics device, parameters and corresponding values, which can be useful in preparing a telematics device configuration, as described in further detail below.

As shown by reference number 115, the telematics configuration platform provides the user device with configuration options (e.g., vehicle options). The telematics configuration platform can provide configuration options that enable a user to provide input regarding the manner in which the telematics device is to be used. In some implementations, the configuration options provided to the user device are based on the entity associated with the telematics device. For example, an organization that is going to use the telematics device for fleet management purposes can be associated with a variety of customizable configuration options that affect the manner in which the telematics configuration platform configures the telematics device. By way of example, the configuration options provided to the user device can include vehicle options that enable a user to select a type of vehicle for which the telematics device is to be used (e.g., large truck, light truck, bus, bicycle, train, airplane, cargo ship, and/or the like), an intended use for the vehicle (e.g., cargo transport, courier services, short-range deliveries, overnight deliveries, and/or the like), an intended group for the vehicle (e.g., a logical grouping created by the user for managing groups of vehicles separately), and/or the like.

The configuration options available to a user can be based on previously configured options associated with the telematics configuration platform. For example, a user might have previously provided the telematics configuration platform with information indicating the types of vehicles telematics devices can be used in, the intended uses for the vehicles, the groups available for the vehicles, and/or the like. In some implementations, the previously provided information can be user specific (e.g., specific to an individual user of telematics devices), organization specific (e.g., specific to an organization that uses telematics devices), or general (e.g., general options that might be applicable to any user of telematics devices).

In some implementations, the configuration options are provided to the user device via a user interface that the telematics configuration platform makes available to the user device. For example, the user interface can include an application interface, web interface, and/or the like, with interface elements such as check boxes, radio buttons, drop down lists, textual input fields, and/or the like, for receiving input from the user regarding the configuration options. An example interface is provided in FIG. 1C, described in further detail below.

By providing the user device with configuration options for the telematics device, the telematics configuration platform can receive information designed to enable the telematics configuration platform to identify telematics device parameters and values that can be useful in configuring the telematics device, as described in further detail below.

As shown by reference number 120, the telematics configuration platform receives user input from the user device. The user input can provide the telematics configuration platform with data identifying the configuration options that were selected by the user of the user device. For example, the user input can indicate which type of vehicle the telematics device is installed in, the intended use of the vehicle, and/or other information that might be relevant to configuring the telematics device. As noted above, the user input can be received via a user interface, such as a web interface, application interface, and/or the like.

As shown by reference number 125, the telematics configuration platform identifies a second set of values for a second set of parameters based on the user input. For example, configuration options received as user input can be associated with one or more telematics device parameters and/or values for the parameters. For example, each type of vehicle, each intended use for a vehicle, each group of vehicles, and/or the like, can be associated with a separate set of parameters and/or parameter values. In some implementations, the second set of parameters, and/or the corresponding values, might have been previously associated with different configuration options, enabling user input that specifies a particular configuration option (e.g., a vehicle type) to be used to obtain corresponding second parameters and/or second values for the particular configuration option (e.g., parameters and/or values previously associated with the vehicle type identified by the user input).

The second set of parameters, and second set of values, can differ from the first set of parameters in a variety of ways. For example, the first set of parameters can be associated with hardware and/or software features and/or capabilities of the telematics device (e.g., the hardware and/or software is included in the telematics device). The second set of parameters can be associated with how the hardware and/or software of the telematics device is to be used. By way of example, an example first parameter (e.g., determined from device data) might specify that the telematics device includes a Wi-Fi radio and software to support the use of the Wi-Fi radio. Example second parameters and corresponding values (e.g., determined based on user input, default configuration data, and/or the like) might indicate whether the Wi-Fi radio should be activated or not, whether the Wi-Fi radio should connect to a Wi-Fi router, security settings to be used when connecting to a Wi-Fi router, naming conventions or SSIDs for Wi-Fi routers that the telematics device is permitted to connect to, and/or the like. As noted above, the second set of parameters (and the corresponding values) might have been obtained based on the user input (e.g., the aforementioned example second parameters and corresponding values can be the default values associated with a particular type of vehicle, a particular vehicle use, a particular group of vehicles, and/or the like). In this way, the telematics configuration platform can identify a second set of values associated with a second set of parameters, which can be used by the telematics configuration platform to configure the telematics device.

As shown by reference number 130, the telematics configuration platform generates a telematics device configuration based on the first and second sets of values for the first and second sets of parameters. The telematics device configuration includes data (e.g., stored in a configuration file, a network packet(s), a Javascript object notation (JSON) string, an application message, and/or the like) designed to enable the telematics device to configure various parameters of the telematics device. In some implementations, the telematics configuration platform can generate the telematics device configuration by including the first and second sets of values for the first and second sets of parameters in the telematics device configuration. For example, in a situation where there are no conflicts between first and second parameters and/or values, the telematics device configuration can include data specifying the first and second sets of parameters and/or values. In a situation where a conflict occurs between first and second parameters and/or values (e.g., a conflict being a situation where a first value and/or parameter overlaps with, is incompatible with, or otherwise conflicts with a second value and/or parameter), the telematics configuration platform can resolve the conflict to determine which parameters and/or values should be included in the telematics device configuration.

In some implementations, the telematics configuration platform can resolve conflicts, and determine which parameters and/or values to include in the telematics device configuration, based on a measure of priority associated with the conflicting values and/or parameters. The measure of priority for a value can depend on a variety of things, such as the source of the default value (e.g., a generic default value, an organization specific default value, a user specific default value, and/or the like). For example, an organization specific default value can override a generic default value, and a user specific default value (e.g., specific to the user associated with the user device and/or telematics device) can override the organization specific value.

In some implementations, the measure of priority associated with a parameter and/or value can be based on a layer at which the parameter and/or value was identified (e.g., each layer being a logical layer associated with how the parameter/value was obtained). For example, a first layer can include a device hardware layer (e.g., hardware based parameter values obtained based on the hardware related device data), a second layer can include a device software layer (e.g., software based parameter values obtained based on the software related device data), a third layer can include a vehicle layer (e.g., parameter values obtained based on a vehicle type, intended vehicle use, and/or the like), and a fourth layer can include a user layer (e.g., parameter values that are based on user input specific to the telematics device). A variety of different parameter layers can be used, and layers can be distinguished in a variety of ways.

In a situation where parameters and/or values are associated with layers, the measure of priority for a parameter and/or layer can depend upon the layer from which the parameter was identified. For example, a hardware based parameter might have a lower priority than a software based parameter, a software based parameter might have lower priority than a vehicle based parameter, and a vehicle based parameter might have a lower priority than a user specified parameter. As noted above, the measure of priority can be used to determine which value should be associated with a particular parameter in a situation where multiple values are provided for the particular parameter. An example of parameter layers, and a corresponding hierarchy, are described below, with reference to FIG. 1B.

By way of example, a first parameter and second parameter can conflict in a situation where the corresponding first and second values overlap. For example, a first parameter can indicate a first default value for a reporting interval parameter of the telematics device (e.g., how often the telematics device reports information to another device, such as the telematics server device), and a second parameter can indicate a second default value for the reporting interval of the telematics device. In this situation, the telematics configuration platform can determine which value (e.g., the first value or second value) should be used to configure the telematics device. The determination can be based on a measure of priority associated with the first and second values (e.g., the value with a highest measure of priority can be used in the telematics device configuration). For example, in a situation where the first default value for the reporting interval came from a first layer (e.g., the device layer), the second default value for the reporting interval came from a second layer (e.g., a vehicle layer), and the second layer has a higher priority than the first layer, the telematics configuration platform can use the second default value for the reporting interval parameter.

In some implementations, parameters included in the first set of parameters (and corresponding values) can be used to determine whether parameters included in the second set of parameters (and corresponding values) are eligible to be used when configuring the telematics device. For example, the first set of parameters (and corresponding values) can be used to limit the second set of parameters (and/or corresponding values). In this situation, some parameters, and/or parameter values, can depend upon the existence and/or value of other parameters. By way of example, a second parameter might indicate that vehicle fuel consumption data should be collected by the telematics device and sent to the telematics server device once every thirty minutes. However, a first value for a first parameter might indicate that the telematics device does not include the hardware and/or software capable of measuring fuel consumption. In this situation, the first value of the first parameter can limit the second value of the second parameter, and the telematics configuration platform might not use (or might ignore) the second value of the second parameter.

In a situation where first values of first parameters limit the second parameters and/or corresponding second values, the telematics configuration platform can handle the limitations in a variety of ways. In some implementations, the limitations presented by the first parameters can cause the telematics configuration platform to limit the configuration options presented to the user device, or include data identifying the limitations in the configuration options (e.g., in a manner designed to make the user of user device aware of limitations imposed by the first parameters). In some implementations, the telematics configuration platform can ignore second values for second parameters in a situation where the second values and/or parameters are not supported by the first values and/or parameters. In some implementations, the telematics configuration platform can adjust values for the first and/or second parameters in a manner designed to match, as closely as possible given the hardware/software limitations, the second values and/or second parameters. Using the example above, a second parameter might indicate that vehicle fuel consumption data should be collected by the telematics device and sent to the telematics server device once every thirty minutes. In a situation where the telematics device is capable of measuring fuel consumption, but not capable of reporting it once every thirty minutes (e.g., due to communications hardware limitations, such as only having a Wi-Fi radio for connectivity), a second value (e.g., thirty minutes) for the second parameter (e.g., reporting fuel consumption) can be changed to a next best fitting value available, such as every thirty minutes when connected to Wi-Fi. Another option, if supported by the telematics device, can be to enable recording of fuel consumption data on a data storage device of the telematics device once every thirty minutes and then reporting the fuel consumption data in bulk when connected to Wi-Fi.

In this way, the telematics configuration platform can generate a telematics device configuration, in view of potential conflicts and/or limitations imposed by the first and second sets of parameters and values. As described below, the telematics device configuration can be used to configure the manner in which the telematics device (and/or the telematics server device) is to be configured.

As shown by reference number 135, the telematics configuration platform provides configuration data to the telematics device. As noted above, the configuration data can include data that enables the telematics device to configure various aspects of the telematics device in the manner specified by the telematics device configuration. For example, the configuration data can include instructions that cause the telematics device to log GPS data, enable a Wi-Fi radio of the telematics device, connect to a Wi-Fi router that corresponds to a particular SSID using a password included in the configuration data whenever the Wi-Fi router is available, provide the logged GPS data to another device using the Wi-Fi connection, and delete the logged GPS data after it has been provided to the other device. Many parameters of the telematics device, including hardware and/or software parameters, can be configured using the configuration data, and the parameters can be updated by the telematics configuration platform by providing additional configuration data and/or updated by a user (e.g., using the user device, the telematics server device, or another device).

As shown by reference number 140, the telematics configuration platform provides configuration data to the telematics server device. In some implementations, the telematics server device can include one or more telematics applications designed to provide various telematics features associated with the telematics device. For example, the telematics server device can include an application designed to configure the telematics device, an application designed to aggregate telematics data from multiple telematics devices, an application designed to report telematics data to one or more other devices, an application designed to perform calculations or analytics using telematics data received from one or more telematics devices, and/or the like. The configuration data provided to the telematics server device can facilitate communications between the telematics server device and the telematics device. For example, the configuration data provided to the telematics server device might indicate to the telematics server device, an identifier of the telematics device, an expected method of communication, expected data to be reported by the telematics device, and/or the like. In this way, the telematics configuration platform can provide the telematics server device with information that enables the telematics server device to execute a variety of telematics related applications and provide a variety of telematics related features.

While example implementation 100 is described with respect to two sets of parameters and corresponding values, additional sets of parameters and corresponding values can be used by the telematics configuration platform. Additionally, or alternatively, while configuration options and user input are depicted as being provided once, additional and/or different configuration options, and additional and/or different user input, can be provided/received multiple times.

Figure 1B:
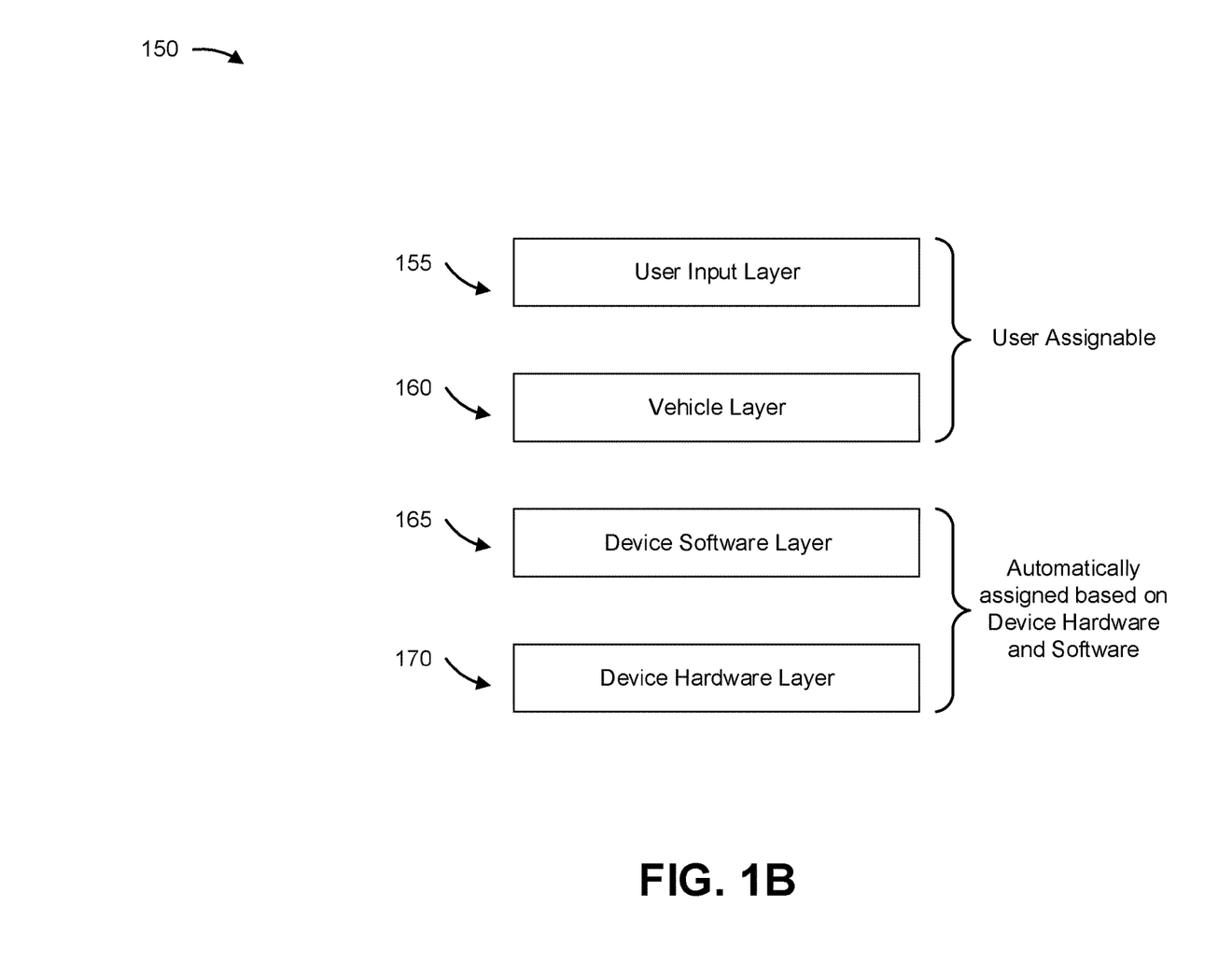

FIG. 1B is a diagram of an example implementation 150 described herein. As shown in FIG. 1B, example implementation 150 includes four layers at which parameters and corresponding values can be obtained for a telematics device. The top layer, the user input layer 155, includes parameters and values that are provided by a user (e.g., provided by a user device in response to the user being presented with configuration options). Parameters and values assigned at the user input layer 155 might have a higher priority than all other layers, in this example. In some implementations, the parameters and values can also be limited by the parameters and values identified by all other layers.

The second layer, the vehicle layer 160, includes parameters and values that are determined based on user input identifying the type of vehicle a telematics device is to be associated with. For example, the parameters and values for a bicycle are likely to be different from parameters and values for an airplane, a large truck, a rail car, and/or the like. Parameters and values assigned at the vehicle layer 160 might have a higher priority than parameters and values assigned at the device software layer 165 and device hardware layer 170, but lower priority than parameters and values assigned at the user input layer 155. In some implementations, the parameters and values assigned at the vehicle layer 160 can limit the options available for parameters and/or values that are assigned at the user input layer 155; and the parameters and values assigned at the vehicle layer 160 can be limited by the parameters and values assigned at the device software layer 165 and/or device hardware layer 170.

The third layer, the device software layer 165, includes parameters and values that are determined based on data associated with software included in the telematics device. For example, the parameters and values for an advanced telematics device with multiple different types of software are likely to be different from parameters and values for a basic telematics device that only includes minimal software. Parameters and values assigned at the device software layer 165 might have a higher priority than parameters and values assigned at the device hardware layer 170, but lower priority than parameters and values assigned at the user input layer 155 and/or vehicle layer 160. In some implementations, the parameters and values assigned at the device software layer 165 can limit the options available for parameters and/or values that are assigned at the user input layer 155 and/or vehicle layer 160; and the parameters and values assigned at the device software layer 165 can be limited by the parameters and values assigned at the device hardware layer 170.

The fourth layer, the device hardware layer 170, includes parameters and values that are determined based on data associated with hardware included in the telematics device. For example, the parameters and values for an advanced telematics device with different types of sensors, methods of communication, and/or the like, are likely to be different from parameters and values for a basic telematics device that only a single sensor and a single method of communication. Parameters and values assigned at the device hardware layer 170 might have a lower priority than parameters and values assigned at all other layers, in this example. In some implementations, the parameters and values assigned at the device hardware layer 170 can limit the options available for parameters and/or values that are assigned at the user input layer 155, vehicle layer 160, and/or device software layer 165.

FIG. 1B is merely an example implementation 150 depicting the manner in which parameters and values can be associated with various layers, which can cause differentiation in priority between parameters and values, and also provide limits for parameters and values. In implementations where layers are used to facilitate telematics device configuration, any number of layers can be used, layers can be associated with any measure of priority (e.g., different layers can be associated with the same or different measures of priority), and layers might or might not limit parameters and/or values that are associated with other layers.

Figure 1C:
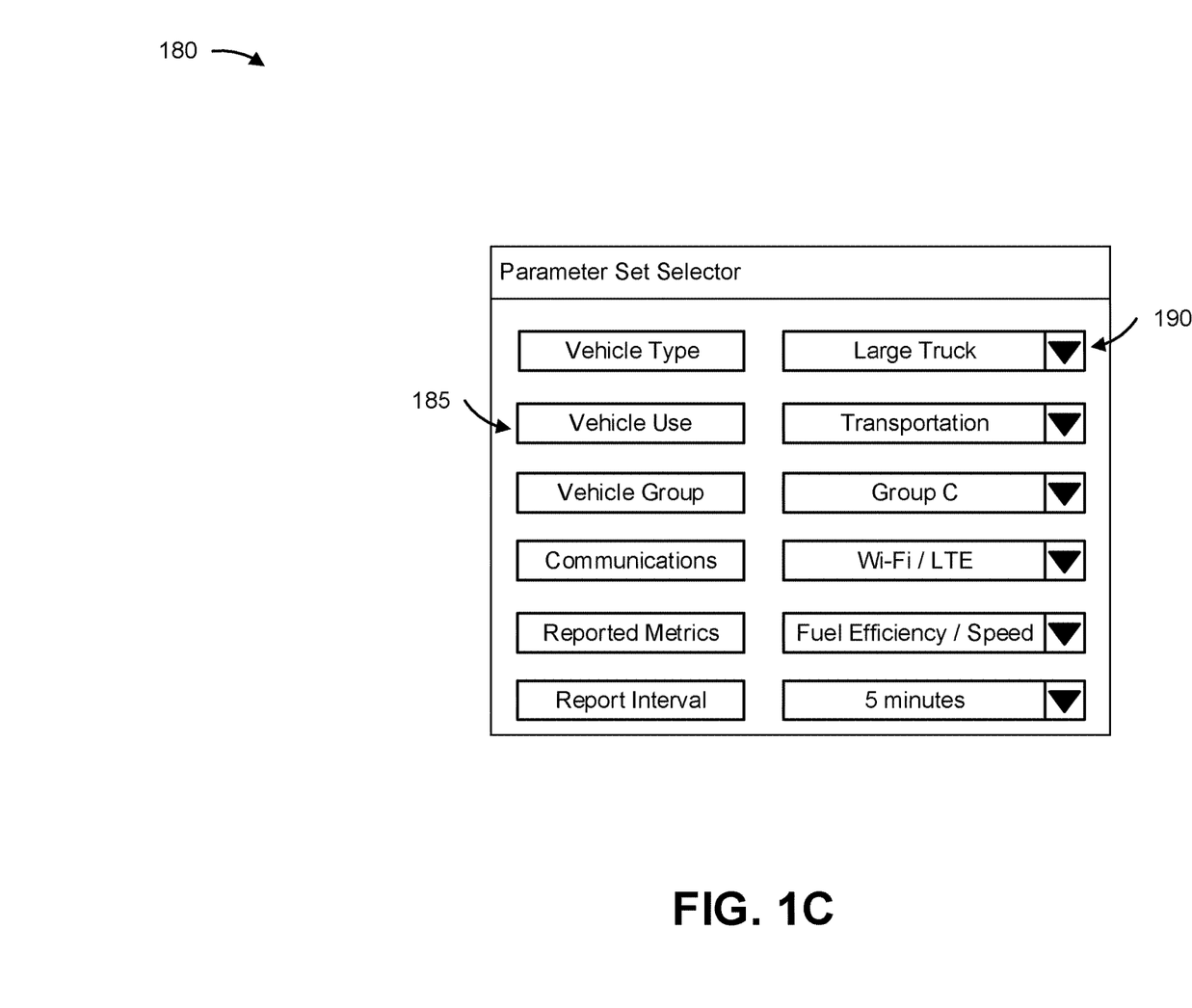

FIG. 1C is a diagram of an example implementation 180 described herein. As shown in FIG. 1C, example implementation 180 includes a user interface through which a user device can provide a telematics configuration platform with user input. As shown by reference number 185, the user interface includes several parameters, such as vehicle type, vehicle user, vehicle group, communications, reported metrics, and report interval. As shown by reference number 190, various values have been selected for the example parameters, such as large truck being selected for the vehicle type parameter, transportation being selected for the vehicle use parameter, group C being selected for the vehicle group parameter, Wi-Fi/LTE being selected for the communications parameter, fuel efficiency/speed being selected for the reported metrics parameter, and five minutes being selected for the report interval parameter.

FIG. 1C is merely an example implementation 180 depicting the manner in which a user interface can be provided to a user device to enable user input to be provided to a telematics configuration platform. In implementations where a user interface is used, a variety of user interface elements can be used to enable selection of various parameters and corresponding values. In some implementations, default parameters and/or values can be auto-completed, and parameters and/or values can be displayed with a visible measure of priority and/or corresponding layer in implementations where measures of priority and/or layers are used. Additionally, or alternatively, the user interface presented by the telematics configuration platform can be different for one type of user device than another type of user device, or from one organization associated with a telematics device to another organization associated with another telematics device.

In this way, the telematics configuration platform can facilitate the configuration of telematics devices, in a manner designed to be relatively quick, uniform, and flexible, and in a manner designed to conserve both human and computing resources. For example, the telematics configuration platform can use previously stored information to determine default configuration parameters and values for various telematics devices, which can enable quick and uniform configuration by obviating the need to manually configure telematics devices. Flexibility can be provided by enabling a user to manually configure some telematics device parameters, e.g., overriding default configuration parameters when appropriate. In addition, for some telematics devices, the telematics configuration platform can configure the telematics devices remotely, obviating the need for configuration to be performed at the location of the telematics devices (e.g., by a technician or a user). Several different stages of the process for configuring telematics devices are automated, which can improve speed and efficiency of the process and conserve computing resources (e.g., processor resources, memory resources, and/or the like). Furthermore, implementations described herein use a rigorous, computerized process to perform tasks or roles that were not previously performed. Also, automating the process for configuring telematics devices conserves computing resources (e.g., processor resources, memory resources, and/or the like) that would otherwise be wasted by using manual processes for attempting to determine the capabilities of telematics devices, which parameters are available to configure, which values should be used, and/or the like.

As indicated above, FIGS. 1A-1C are provided merely as an example. Other examples are possible and can differ from what was described with regard to FIGS. 1A-1C.

Figure 2:
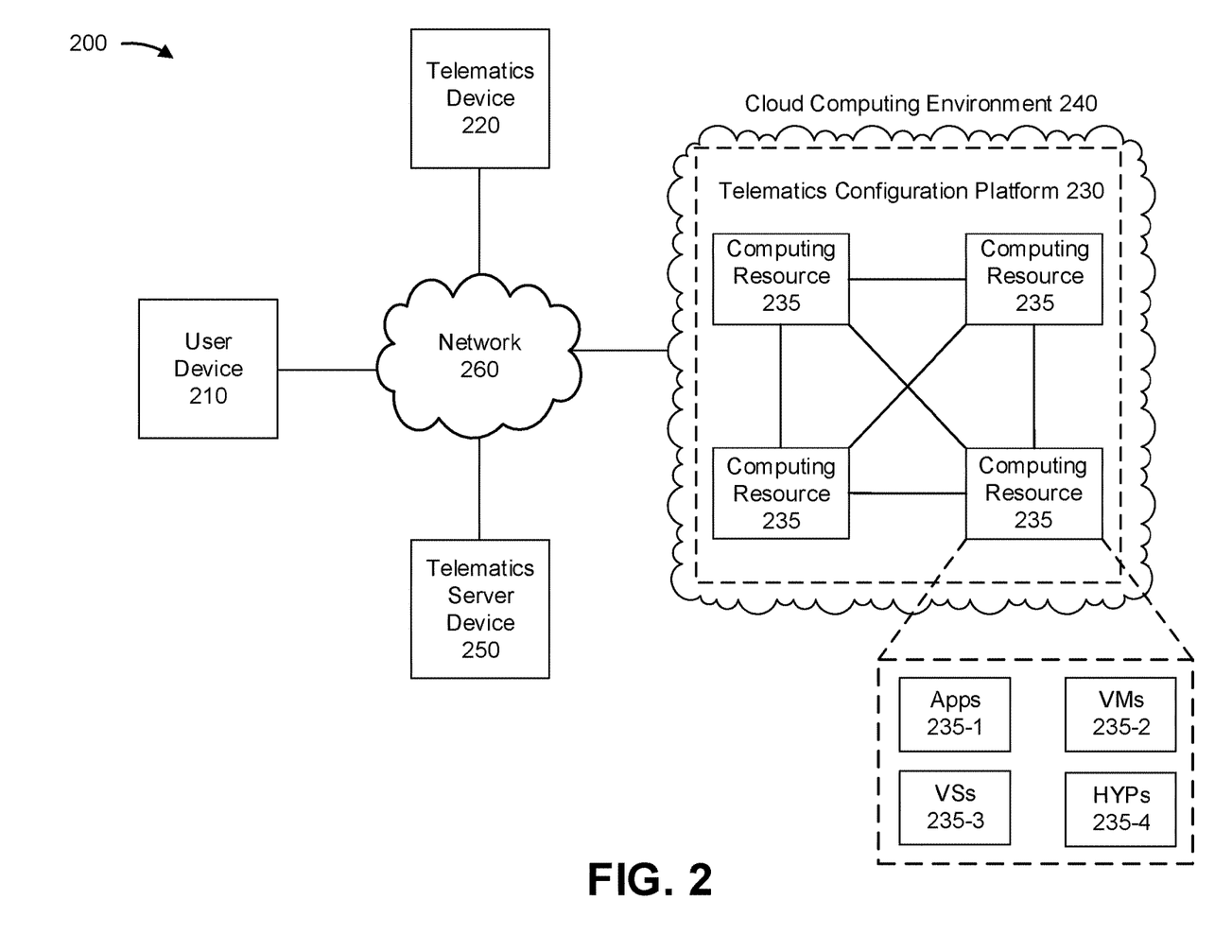
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a telematics device 220, a telematics configuration platform 230, a computing resource 235, a cloud computing environment 240, a telematics server device 250, and a network 260. Devices of environment 200 can interconnect via wired connections, wireless connections, or a combination of wired and wireless connections.

User device 210 includes one or more devices capable of receiving, generating, storing, processing, and/or providing information associated with configuring telematics devices. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 can obtain configuration options from telematics configuration platform 230, and can obtain user input from a user and provide the user input to telematics configuration platform 230.

Telematics device 220 includes one or more devices capable of receiving, generating, storing, processing, and/or providing information associated with performing telematics functions. For example, telematics device 220 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Telematics device 220 can include a GPS device that tracks the location of a vehicle in which telematics device 220 is included, can include communications hardware and/or software, and can connect to a computer and/or other components of a vehicle to obtain information such as the vehicle's reported speed, airbag deployment, fuel level, fuel consumption, acceleration and/or braking information, and/or the like.

Telematics configuration platform 230 includes one or more devices capable of receiving, generating, storing, processing, and/or providing information associated with configuring telematics devices. For example, telematics configuration platform 230 can include a server device (e.g., a host server, a web server, an application server, etc.), a data center device, or a similar device. Telematics configuration platform 230 can receive information regarding hardware and/or software used by telematics device 220 and can identify a variety of parameters (and values for the parameters) that indicate various capabilities associated with telematics device 220. Telematics configuration platform 230 can use information identifying a user associated with telematics device 220, can provide the user with vehicular configuration options for which the user is able to provide input, and can use the input to generate a telematics device configuration.

In some implementations, as shown, telematics configuration platform 230 can be hosted in cloud computing environment 240. Notably, while implementations described herein describe telematics configuration platform 230 as being hosted in cloud computing environment 240, in some implementations, telematics configuration platform 230 might not be cloud-based (i.e., can be implemented outside of a cloud computing environment 240) or might be partially cloud-based.

Cloud computing environment 240 includes an environment that delivers computing as a service, whereby shared resources, services, etc. can be provided to telematics configuration platform 230. Cloud computing environment 240 can provide computation, software, data access, storage, and/or other services that do not require end-user knowledge of a physical location and configuration of a system and/or a device that delivers the services. As shown, cloud computing environment 240 can include a telematics configuration platform 230 and a computing resource 235.

Computing resource 235 includes one or more personal computers, workstation computers, server devices, or another type of computation and/or communication device. In some implementations, computing resource 235 can host telematics configuration platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by user device 210. Application 235-1 can eliminate a need to install and execute the software applications on user device 210. For example, application 235-1 can include software associated with telematics configuration platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., user device 210), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Telematics server device 250 includes one or more devices capable of receiving, generating, storing, processing, and/or providing information associated with configuring telematics devices. For example, telematics server device 250 can include a server device (e.g., a host server, a web server, an application server, etc.), a data center device, or a similar device. Telematics server device 250 can be capable of communicating with user device 210, telematics device 220, and/or telematics configuration platform 230, in a manner designed to facilitate configuration and/or use of telematics devices. For example, telematics server device 250 can receive telematics device configuration information from telematics configuration platform 230, which can enable the telematics server device 250 to communicate with telematics device 220 and facilitate performing a variety of actions based on information provided by telematics device 220.

Network 260 includes one or more wired and/or wireless networks. For example, network 260 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
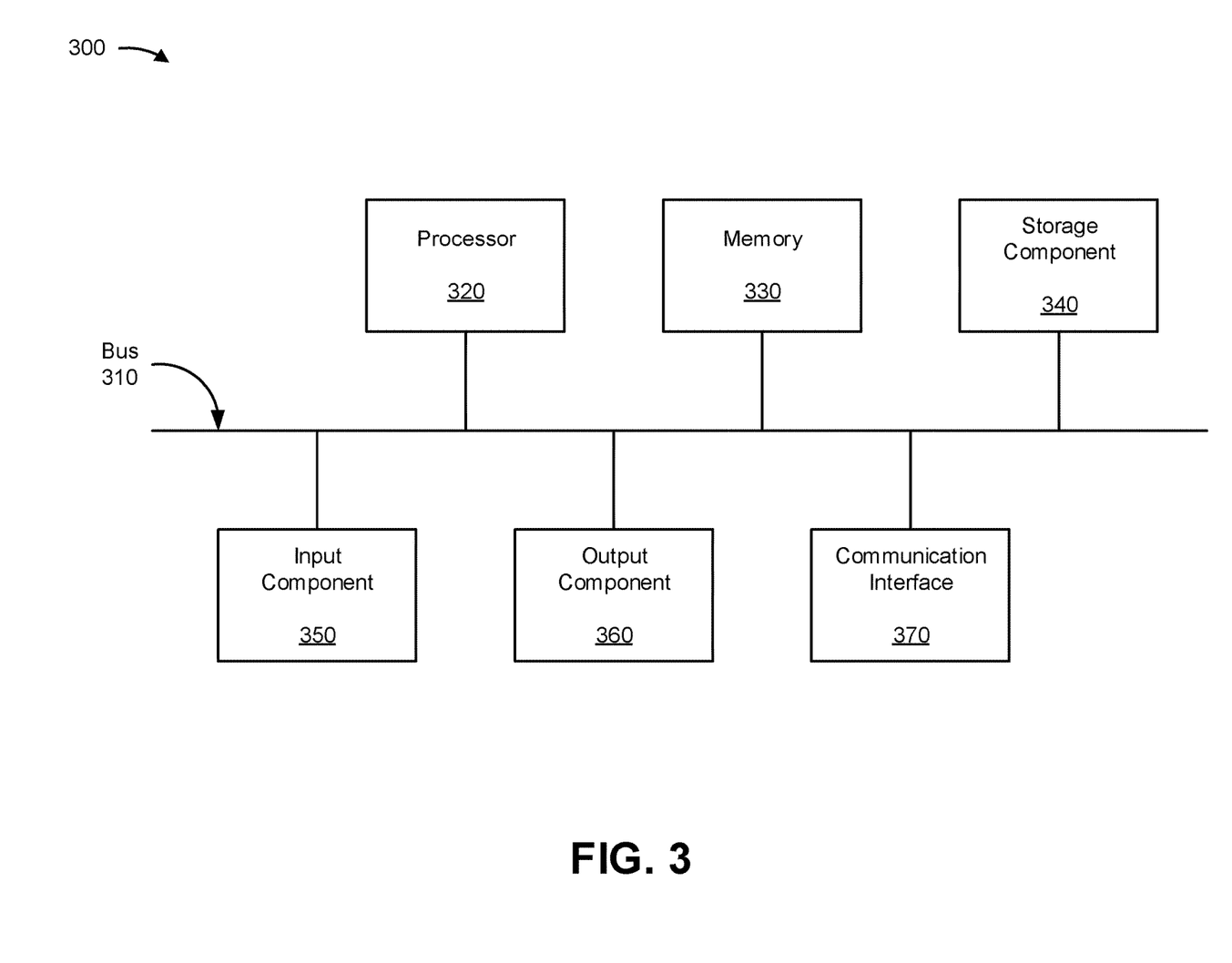
FIG. 3 is a diagram of example components of one or more devices of FIG. 2.

FIG. 3 is a diagram of example components of a device 300. Device 300 can correspond user device 210, telematics device 220, telematics configuration platform 230, computing resource 235, and/or telematics server device 250. In some implementations user device 210, telematics device 220, telematics configuration platform 230, computing resource 235, and/or telematics server device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
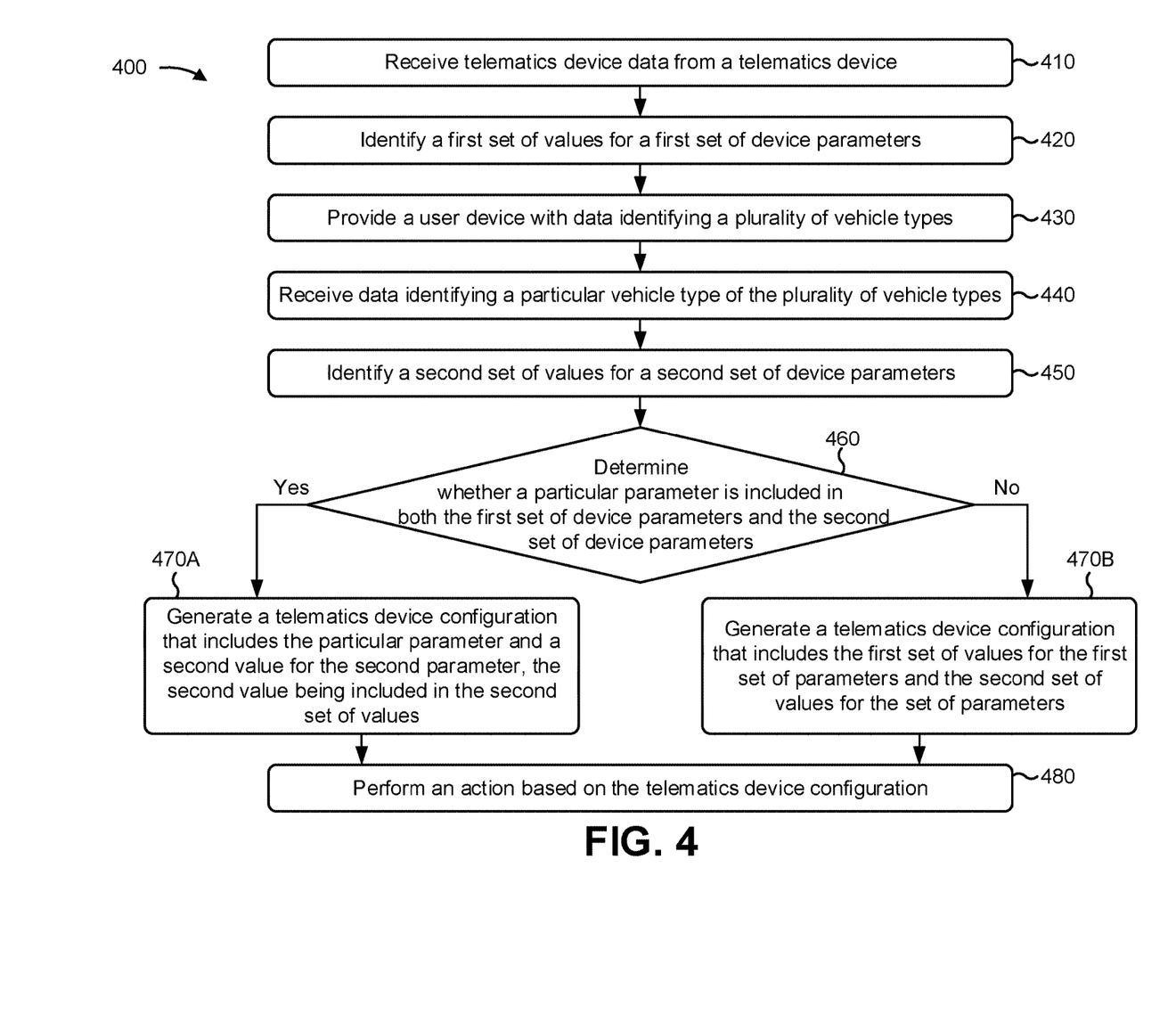
FIG. 4 is a flow chart of an example process for configuring telematics devices.

FIG. 4 is a flow chart of an example process 400 for configuring telematics devices. In some implementations, one or more process blocks of FIG. 4 can be performed by a telematics configuration platform (e.g. telematics configuration platform 230). In some implementations, one or more process blocks of FIG. 4 can be performed by another device or a group of devices separate from or including a telematics configuration platform (e.g. telematics configuration platform 230), such as a user device (e.g. user device 210), a telematics device (e.g. telematics device 220), a computing resource (e.g. computing resource 235), and/or a telematics server device (e.g. telematics server device 250).

As shown in FIG. 4, process 400 can include receiving telematics device data from a telematics device (block 410). For example, the telematics configuration platform can receive telematics device data from a telematics device, as described above in connection with FIGS. 1A-1C. In some implementations, the telematics device data can specify hardware and software features associated with the telematics device.

As further shown in FIG. 4, process 400 can include identifying a first set of values for a first set of device parameters (block 420). For example, the telematics configuration platform can identify, based on the telematics device data, a first set of values for a first set of telematics device parameters, as described above in connection with FIGS. 1A-1C.

As further shown in FIG. 4, process 400 can include providing a user device with data identifying a plurality of vehicle types (block 430). For example, the telematics configuration platform can provide a user device with data identifying a plurality of vehicle types that are associated with the telematics device, as described above in connection with FIGS. 1A-1C.

As further shown in FIG. 4, process 400 can include receiving data identifying a particular vehicle type of the plurality of vehicle types (block 440). For example, the telematics configuration platform can receive, from the user device, user input identifying a particular vehicle type of the plurality of vehicle types, as described above in connection with FIGS. 1A-1C.

As further shown in FIG. 4, process 400 can include identifying a second set of values for a second set of device parameters (block 450). For example, the telematics configuration platform can identify, based on the particular vehicle type, a second set of values for a second set of device parameters, as described above in connection with FIGS. 1A-1C.

As further shown in FIG. 4, process 400 can include determining whether a particular parameter is included in both the first set of device parameters and the second set of device parameters (block 460). For example, the telematics configuration platform can determine whether a particular parameter is included in both the first set of device parameters and the second set of device parameters, as described above in connection with FIGS. 1A-1C.

As further shown in FIG. 4, if the telematics configuration platform determines that a particular parameter is included in both the first set of device parameters and the second set of device parameters (block 460—YES) process 400 can include generating a telematics device configuration that includes the particular parameter and a second value for the second parameter, the second value being included in the second set of values (block 470A). For example, the telematics configuration platform can generate a telematics device configuration that includes the particular parameter and a second value for the second parameter, the second value being included in the second set of values, as described above in connection with FIGS. 1A-1C.

As further shown in FIG. 4, if the telematics configuration platform determines that a particular parameter is not included in both the first set of device parameters and the second set of device parameters (block 460—NO) process 400 can include generating a telematics device configuration that includes the first set of values for the first set of parameters and the second set of values for the set of parameters (block 470B). For example, the telematics configuration platform can generate a telematics device configuration that includes the first set of values for the first set of parameters and the second set of values for the set of parameters, as described above in connection with FIGS. 1A-1C.

In some implementations, the telematics device configuration can include a third set of device parameters, the third set of device parameters including telematics device parameters including a first parameter from the first set of telematics device parameters and a second parameter from the second set of telematics device parameters, and a third set of values for the third set of device parameters, each value included in the third set of values corresponding to either a first value included in the first set of values or a second value included in the second set of values.

As further shown in FIG. 4, process 400 can include performing an action based on the telematics device configuration (block 480). For example, the telematics configuration platform can perform an action based on the telematics device configuration, as described above in connection with FIGS. 1A-1C.

Process 400 can include additional implementations, such as any single implementation or any combination of implementations described below and/or in connection with one or more other processes described elsewhere herein.

In some implementations, the hardware and software features associated with the telematics device can include wireless communications hardware, vehicular communications hardware, global positioning satellite (GPS) hardware, data processor hardware, data storage hardware, operating system software, and/or telematics device software. In some implementations, the plurality of vehicle types can include a large automobile type, a small automobile type, a human-powered vehicle, an aircraft type, a watercraft type, and/or a rail type.

In some implementations, the first set of values associated with the first set of telematics device parameters can be associated with a first measure of priority, the second set of values associated with the second set of telematics device parameters can be associated with a second measure of priority, and at least one value included in the third set of values can be selected based on the first measure of priority exceeding the second measure of priority. In some implementations, the first set of values associated with the first set of telematics device parameters can be associated with a first measure of priority, the second set of values associated with the second set of telematics device parameters can be associated with a second measure of priority, and at least one value included in the third set of values can be selected based on the second measure of priority exceeding the first measure of priority.

In some implementations, when performing the action based on the telematics device configuration, the telematics configuration platform can provide the telematics device configuration to the telematics device for application of the telematics device configuration to the telematics device. In some implementations, when performing the action based on the telematics device configuration, the telematics configuration platform can provide the telematics device configuration to a telematics server for application of at least a portion of the telematics device configuration to the telematics server.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, telematics configuration platform 230 can facilitate the configuration of telematics devices 220, in a manner designed to be relatively quick, uniform, and flexible, and in a manner designed to conserve both human and computing resources. For example, telematics configuration platform 230 can use previously stored information to determine default configuration parameters and values for various telematics devices 220, which can enable quick and uniform configuration by obviating the need to manually configure telematics devices 220. Flexibility can be provided by enabling a user to manually configure some telematics device parameters, e.g., overriding default configuration parameters when appropriate. In addition, for some telematics devices 220, telematics configuration platform 230 can configure the telematics devices 220 remotely, obviating the need for configuration to be performed at the location of the telematics devices 220 (e.g., by a technician or a user). Several different stages of the process for configuring telematics devices 220 are automated, which can improve speed and efficiency of the process and conserve computing resources (e.g., processor resources, memory resources, and/or the like). Furthermore, implementations described herein use a rigorous, computerized process to perform tasks or roles that were not previously performed. Also, automating the process for configuring telematics devices conserves computing resources (e.g., processor resources, memory resources, and/or the like) that would otherwise be wasted by using manual processes for attempting to determine the capabilities of telematics devices, which parameters are available to configure, which values should be used, and/or the like.

The foregoing disclosure provides illustration and description, but is not intended to be exhaustive or to limit the implementations to the precise form disclosed. Modifications and variations are possible in light of the above disclosure or might be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as might be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a telematics device, telematics device data,
      the telematics device data specifying hardware and software features associated with the telematics device;
   identifying, by the device and based on the telematics device data, a first set of values for a first set of telematics device parameters,
      wherein the first set of values are associated with a first measure of priority;
   providing, by the device, a user device with data identifying a plurality of vehicle types that are associated with the telematics device;
   receiving, by the device and from the user device, user input identifying a particular vehicle type of the plurality of vehicle types;
   identifying, by the device and based on the particular vehicle type, a second set of values for a second set of telematics device parameters,
      wherein the second set of values are associated with a second measure of priority;
   generating, by the device, a telematics device configuration,
      the telematics device configuration including:
         a third set of device parameters,
            the third set of device parameters including telematics device parameters including a first parameter from the first set of telematics device parameters and a second parameter from the second set of telematics device parameters, and
         a third set of values for the third set of device parameters,
            each value included in the third set of values corresponding to either a first value included in the first set of values or a second value included in the second set of values, and
            wherein at least one value included in the third set of values is selected based on the first measure of priority exceeding the second measure of priority; and
   configuring, by the device, the telematics device based on the telematics device configuration.

2. The method of claim 1, wherein the hardware and software features associated with the telematics device include at least one of:
   wireless communications hardware,
   vehicular communications hardware,
   global positioning satellite (GPS) hardware,
   data processor hardware,
   data storage hardware,
   operating system software, or
   telematics device software.

3. The method of claim 1, wherein the plurality of vehicle types includes at least one of:
   a large automobile type,
   a small automobile type,
   a human-powered vehicle,
   an aircraft type,
   a watercraft type, or
   a rail type.

4. The method of claim 1, wherein:
   at least one other value included in the third set of values is selected based on the second measure of priority exceeding the first measure of priority.

5. The method of claim 1, wherein configuring the telematics device based on the telematics device configuration comprises:
   providing the telematics device configuration to the telematics device,
      the telematics device being configured based on receiving the telematics device configuration.

6. The method of claim 1, wherein configuring the telematics device based on the telematics device configuration comprises:
   providing the telematics device configuration to a telematics server,
      the telematics server being configured to configure the telematics device based on receiving the telematics device configuration.

7. The method of claim 1, wherein the first measure of priority is based on a logical layer associated with the first set of telematics device parameters, the logical layer including one of:
   a device hardware layer,
   a device software layer,
   a vehicle layer, or
   a user layer.

8. A device comprising:
   one or more memories; and
   one or more processors, communicatively coupled to the one or more memories, to:
      receive, from a telematics device, telematics device data,
         the telematics device data specifying hardware and software features associated with the telematics device;
      identify, based on the telematics device data, a first set of values for a first set of telematics device parameters,
         wherein the first set of values are associated with a first measure of priority;
      provide a user device with data identifying a plurality of vehicle types that are associated with the telematics device;
      receive, from the user device, user input identifying a particular vehicle type of the plurality of vehicle types;

identify, based on the particular vehicle type, a second set of values for a second set of telematics device parameters,
   wherein the second set of values are associated with a second measure of priority;
generate a telematics device configuration,
   the telematics device configuration including:
      a third set of device parameters,
         the third set of device parameters including telematics device parameters including a first parameter from the first set of telematics device parameters and a second parameter from the second set of telematics device parameters, and
      a third set of values for the third set of device parameters,
         each value included in the third set of values corresponding to either a first value included in the first set of values or a second value included in the second set of values, and
         wherein at least one value included in the third set of values is selected based on the first measure of priority exceeding the second measure of priority; and
configure the telematics device based on the telematics device configuration.

9. The device of claim 8, wherein the hardware and software features associated with the telematics device include at least one of:
   wireless communications hardware,
   vehicular communications hardware,
   global positioning satellite (GPS) hardware,
   data processor hardware,
   data storage hardware,
   operating system software, or
   telematics device software.

10. The device of claim 8, wherein the plurality of vehicle types includes at least one of:
   a large automobile type,
   a small automobile type,
   a human-powered vehicle,
   an aircraft type,
   a watercraft type, or
   a rail type.

11. The device of claim 8, wherein:
   at least one other value included in the third set of values is selected based on the second measure of priority exceeding the first measure of priority.

12. The device of claim 8, wherein the one or more processors, when configuring the telematics device based on the telematics device configuration, are to:
   provide the telematics device configuration to the telematics device,
      the telematics device being configured based on receiving the telematics device configuration.

13. The device of claim 8, wherein the one or more processors, when configuring the telematics device based on the telematics device configuration, are to:
   provide the telematics device configuration to a telematics server,
      the telematics server being configured to configure the telematics device based on receiving the telematics device configuration.

14. The device of claim 8, wherein the first measure of priority is based on a logical layer associated with the first set of telematics device parameters, the logical layer including one of:
   a device hardware layer,
   a device software layer,
   a vehicle layer, or
   a user layer.

15. A non-transitory computer-readable medium storing instructions, the instructions comprising:
   one or more instructions that, when executed by one or more processors, cause the one or more processors to:
      receive, from a telematics device, telematics device data,
         the telematics device data specifying hardware and software features associated with the telematics device;
      identify, based on the telematics device data, a first set of values for a first set of telematics device parameters,
         wherein the first set of values are associated with a first measure of priority;
      provide a user device with data identifying a plurality of vehicle types that are associated with the telematics device;
      receive, from the user device, user input identifying a particular vehicle type of the plurality of vehicle types;
      identify, based on the particular vehicle type, a second set of values for a second set of telematics device parameters,
         wherein the second set of values are associated with a second measure of priority;
      generate a telematics device configuration,
         the telematics device configuration including:
            a third set of device parameters,
               the third set of device parameters including telematics device parameters including a first parameter from the first set of telematics device parameters and a second parameter from the second set of telematics device parameters, and
            a third set of values for the third set of device parameters,
               each value included in the third set of values corresponding to either a first value included in the first set of values or a second value included in the second set of values, and
               wherein at least one value included in the third set of values is selected based on the first measure of priority exceeding the second measure of priority; and
      configure the telematics device based on the telematics device configuration.

16. The non-transitory computer-readable medium of claim 15, wherein the hardware and software features associated with the telematics device include at least one of:
   wireless communications hardware,
   vehicular communications hardware,
   global positioning satellite (GPS) hardware,
   data processor hardware,
   data storage hardware,
   operating system software, or
   telematics device software.

17. The non-transitory computer-readable medium of claim 15, wherein the plurality of vehicle types includes at least one of:
   a large automobile type,
   a small automobile type,
   a human-powered vehicle,
   an aircraft type,
   a watercraft type, or
   a rail type.

18. The non-transitory computer-readable medium of claim 15, wherein:
   at least one other value included in the third set of values is selected based on the second measure of priority exceeding the first measure of priority.

19. The non-transitory computer-readable medium of claim 15, wherein the one or more instructions, that cause the one or more processors to configure the telematics device based on the telematics device configuration, cause the one or more processors to:
   provide the telematics device configuration to the telematics device,
      the telematics device being configured based on receiving the telematics device configuration.

20. The non-transitory computer-readable medium of claim 15, wherein the one or more instructions, that cause the one or more processors to configure the telematics device based on the telematics device configuration, cause the one or more processors to:
   providing the telematics device configuration to a telematics server,
      the telematics server being configured to configure the telematics device based on receiving the telematics device configuration.

\* \* \* \* \*